United States Patent
Kwak (10) Patent No.: US 6,175,391 B1
(45) Date of Patent: Jan. 16, 2001

(54) DIGITAL TV RECEIVER

(75) Inventor: Heung Sik Kwak, Kyungki-do (KR)

(73) Assignee: LG Electronics Inc., Seoul (KR)

( * ) Notice: Under 35 U.S.C. 154(b), the term of this patent shall be extended for 0 days.

(21) Appl. No.: 09/265,983

(22) Filed: Mar. 11, 1999

(30) Foreign Application Priority Data

Mar. 12, 1998 (KR) .................................................. 98-8335

(51) Int. Cl.[7] .............................. H04N 7/00; H04N 5/08; H04L 7/00
(52) U.S. Cl. .......................... 348/725; 348/464; 348/465; 348/466; 348/725; 348/525; 348/845.3; 375/368
(58) Field of Search .................................... 348/464, 465, 348/466, 525, 845.3, 725; 375/368, 365; 370/514, 503

(56) References Cited

U.S. PATENT DOCUMENTS

| | | | |
|---|---|---|---|
| 5,416,524 | * 5/1995 | Citta et al. | 348/471 |
| 5,548,339 | * 8/1996 | Kim | 348/525 |
| 5,598,429 | * 1/1997 | Marshall | 375/210 |
| 5,638,140 | * 6/1997 | Krishnamurthy et al. | 348/735 |
| 5,754,250 | * 5/1998 | Cooper | 348/525 |
| 5,949,817 | * 9/1999 | Marshall | 375/208 |
| 5,949,834 | * 9/1999 | Laud et al. | 375/364 |
| 5,959,682 | * 9/1999 | Kim et al. | 348/511 |
| 6,014,416 | * 1/2000 | Shin et al. | 375/354 |

* cited by examiner

Primary Examiner—John K. Peng
Assistant Examiner—Paulos Natnael (57) ABSTRACT

Digital TV receiver including an antenna, a tuner for synchronizing one of a plurality of digital TV signals received at the antenna, the digital TV signal having data streams, and each data stream having a plurality of symbols, a comparing unit for comparing data streams of the synchronized digital TV signal to an already stored symbol pattern of a synchronizing signal in succession, to provide a positive number if found identical as a result of the comparison or either one of a negative value or a zero if found different as the result of the comparison, memories each having an identical initial value the memories corresponding to symbols in the data stream in one to one fashion, an adder for adding signals provided as many as a number of symbols in the data stream from the comparing unit in succession to corresponding initial values in the memories in succession when each of the data streams is received and keeping updating the initial values in the memories by storing the added signals to corresponding memories, and a synchronization detector for checking the values stored in the memories in data stream units to detect signals equal to or greater than a preset reference value as position signals of the synchronizing signals, whereby preventing wrong detection of the synchronizing signal because the synchronizing reference value is set higher than a noise signal, such as a ghost.

32 Claims, 7 Drawing Sheets

DIGITAL TV RECEIVER

BACKGROUND OF THE INVENTION

1. Field of the Invention

The present invention relates to a device for detecting a synchronizing signal from a digital TV signal.

2. Background of the Related Art

Figure 1:
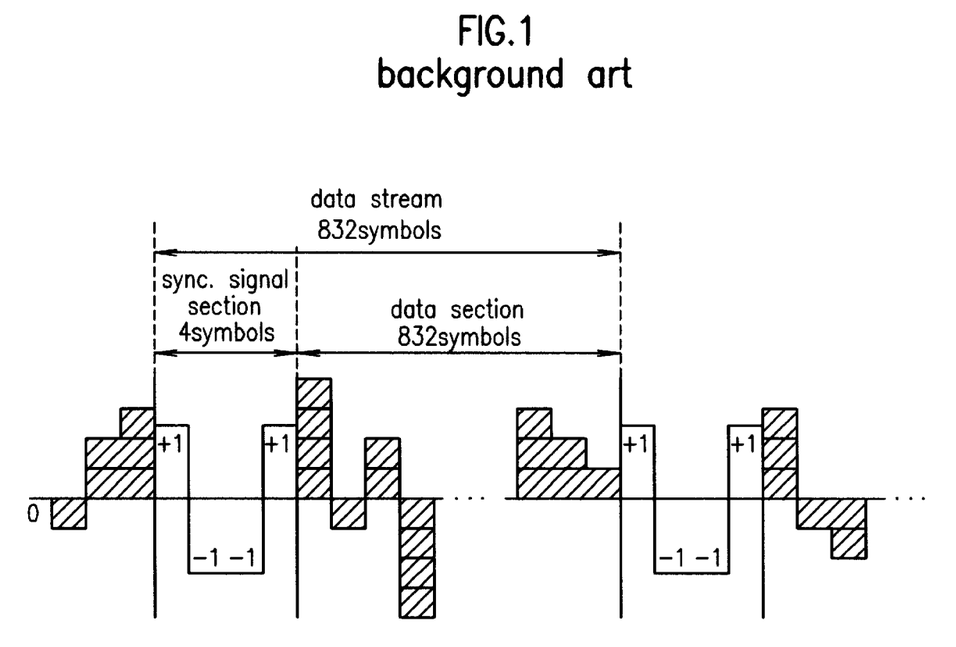
FIG. 1 illustrates a diagram showing a related art VSB transmission signal structure.

A digital TV broadcasting system adopted by the ATSC (Advanced Television Systems Committee) in general uses a terrestrial VSB(Vestigial Side Band) transmission system. In the digital TV broadcasting system, a video data and a synchronizing signal are transmitted, separately. And, on a receiver side, a position of the synchronizing signal should be accurately detected from the video data. As the synchronizing signal indicates agreed sections from other sections, it is very important to detect the position of the synchronizing signal, accurately. In other word, because the synchronizing signal is a reference of time in processing signals of other units in the receiver, an accurate detection of the synchronizing signal at a data reception terminal is very important. In a digital broadcasting signal, a pattern of the synchronizing signal is in general inserted in the video data so that the synchronizing signal can be detected on the receiver side. Referring to FIG. 1 illustrating a related art VSB transmission data, in the VSB transmission system, a data stream(or bit stream) is used, in which particular synchronizing signal patterns are inserted at fixed intervals for easy detection of the synchronizing signal. In this instance, one section of data stream has 832 symbols of successive data segments, including four symbols of synchronizing section and 828 symbols of data section. The synchronizing section has two levels of signals of '−1' or '+1', and the data section has eight levels of signals.

A related art device for detecting a synchronizing signal from a VSB transmission signal, a digital broadcasting signal, will be explained with reference to the attached drawings. FIG. 1 illustrates a waveform showing a related art data structure, FIG. 2 illustrates a block diagram showing a related art device for detecting a synchronizing signal from a VSB transmission signal, and FIGS. 3a–3c illustrate waveforms showing an example of detecting the synchronizing signal using the device shown in FIG. 2.

Figure 2:
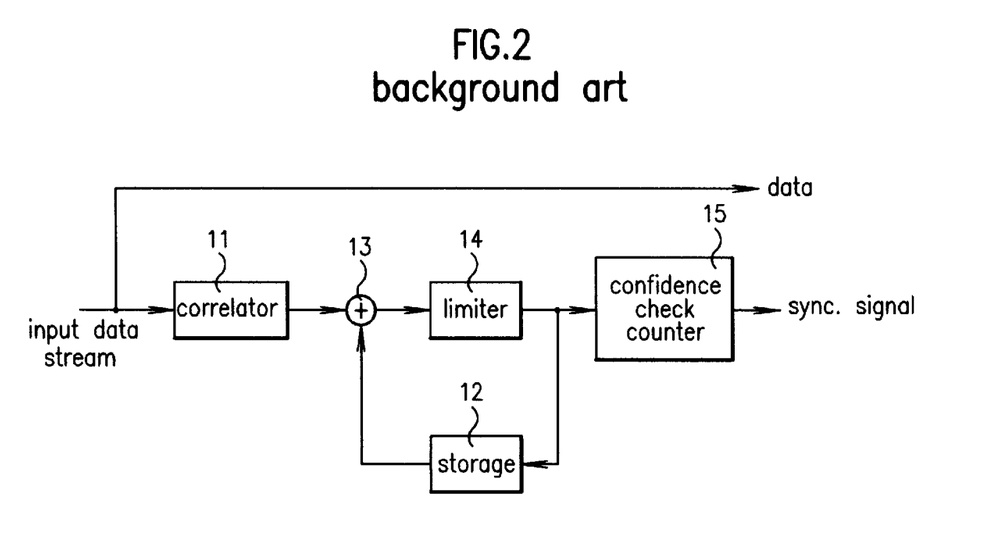
FIG. 2 illustrates a block diagram showing a related art device for detecting a synchronizing signal from a VSB transmission signal.
Figure 3A:
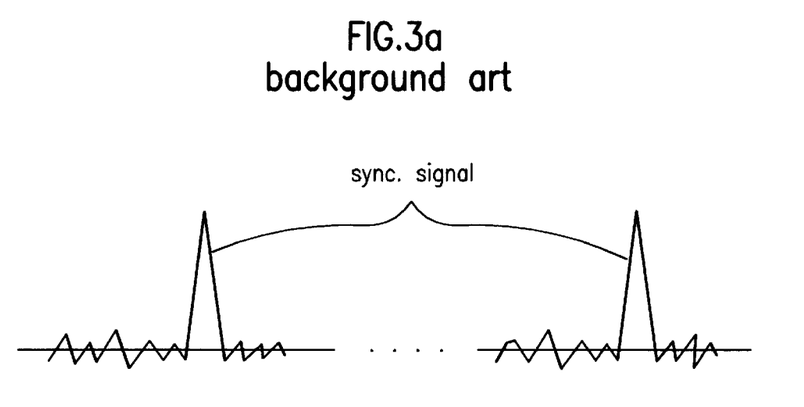
FIG. 3a illustrates a waveform showing a digital TV signal including synchronizing signals.
Figure 3B:
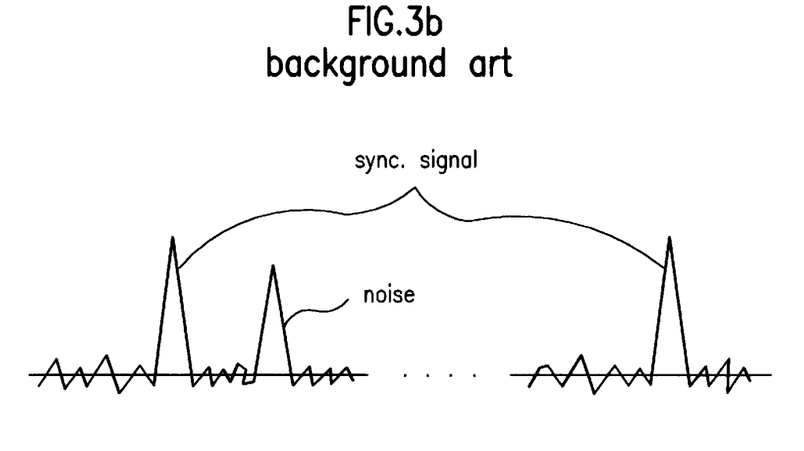
FIG. 3b illustrates a waveform showing a digital TV signal including a noise.
Figure 3C:
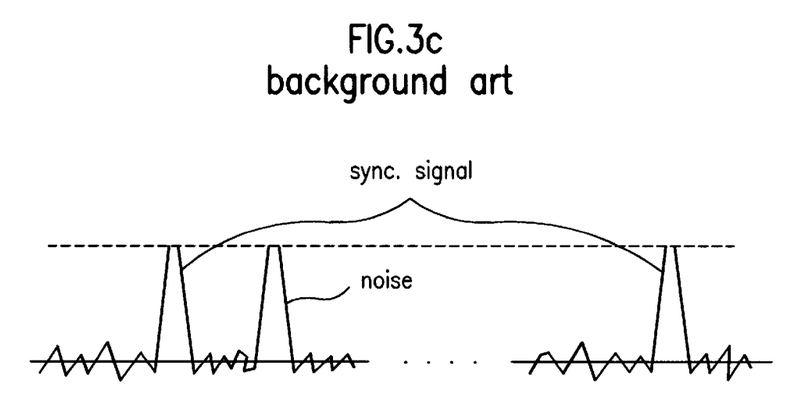
FIG. 3c illustrates a waveform provided for explaining related art problems.

Referring to FIG. 2, the related art device for detecting a synchronizing signal from a VSB transmission signal is provided with a correlator 11 for subjecting a VSB transmission signal received in a form of data stream and a synchronizing signal pattern set in itself to correlation operation, a storage 12 for storing an output from the correlator 11, an adder 13 for adding a value stored in the storage 12 to an output from the correlator 11, a limiter 14 for limiting an output from the adder 13 not to exceed a given plus level, and a confidence check counter 15 for detecting a signal from outputs of the limiter 14 higher than the given plus level as a synchronizing signal, and removing the synchronizing signal which is detected by mistake momentarily.

The operation of the aforementioned related art device for detecting a synchronizing signal will be explained.

Upon reception of the VSB transmission signal in a form of bit stream, the correlator 11 subjects the signal and a synchronizing signal pattern set therein to correlation operation while shifting the VSB transmission signal by one symbol unit, and forwards results of the operations in succession. The correlation operation is one in which the synchronizing signal patterns of "+1, +1, −1, +1" are respectively multiplied to corresponding shifted data and results of the operation are added. If the data shifted presently is a synchronizing signal pattern, when the shifted synchronizing signal pattern and the synchronizing pattern stored in itself are subjected to a correlation operation, a resultant of the operation will be four which is a maximum value. That is, if the synchronizing signal pattern set in itself is "+1, −1, −1, +1", the resultant of the operation will be the maximum value "4" because the shifted synchronizing signal pattern will also be the same "+1, −1, −1, +1". On the other hand, since it is highly probable that the shifted synchronizing signal pattern has a symbol different from the preset synchronizing signal pattern in signal sections other than the synchronizing signal section, the resultants of the correlation operations will be below "4". Consequently, a resultant of the correlation operation obtained in an interval at which the synchronizing signal section in the bit stream and the section of the preset synchronizing signal pattern are met provides a signal higher than a level of the signal which is provided as a resultant of the correlation operation obtained in an interval at which the data section in the bit stream and the section of the preset synchronizing signal pattern are met. As shown in FIG. 1, the storage 12 has 832 memories in view of the repetition of the synchronizing signal at every 832 symbols. The adder 13 adds a value stored in the storage 12 and an output from the correlator 11 to update a value in the storage 12. In this instance, if the value in the storage 12 is updated as the output from the correlator 11 is added thereto by the adder 13, the value in the storage 12 corresponding to the synchronizing signal section will keep increasing while an average of the values in the storage 12 corresponding to the data section other than the synchronizing signal section will keep approaching to '0' because patterns are random, i.e., positive(+) outputs and negative(−) outputs are added by the adder 13 in the updating of the value is the storage 12, which results are shown in FIG. 3a. However, if these operations are kept repeating, peak values in FIG. 3a are kept greater until the peak values are diverged, thereby causing a malfunction of the synchronizing signal detecting circuit. Therefore, the limiter 14 limits a sum of the output from the correlator 11 via the adder 13 and the output from the storage 12 to be greater than the given plus level. Then, the confidence check counter 15 detects a position where one of the outputs from the limiter 14 is greater than the given level and makes a confidence check for reducing detection error caused by momentary very great noise, to detect accurate positions of the synchronizing signals as shown in FIG. 3a, finally.

In the meantime, as shown in FIG. 3b, when an external noise is occurred at a position spaced from the synchronizing signal due to ghost or others during reception of data, since the noise is at a level lower than the detected synchronizing signal theoretically, the external noise gives no great influence to the synchronizing signal detection. However, as shown in FIG. 3c, in the related art, because the synchronizing signal is limited to the give level by the limiter 14, distinguishing the synchronizing signal from the noise signal is not possible, practically. Thus, as the limiting operation is made for preventing divergence of the output, the related art device for detecting a synchronizing signal from a VSB transmission signal has a problem in that a wrong synchronizing signal may be detected depending on the limiting level when a noise of a preset level is occurred. In other word, the use of limiter for preventing divergence of an accumulation loop may limit a synchronizing signal recovery performance depending on a limiting value used when a ghost signal is in a transmission channel.

SUMMARY OF THE INVENTION

Accordingly, the present invention is directed to a digital TV receiver and a method for detecting a synchronizing signal in a digital TV receiver that substantially obviates one or more of the problems due to limitations and disadvantages of the related art.

An object of the present invention is to provide a digital TV receiver and a method for detecting a synchronizing signal in a digital TV receiver which can prevent malfunctions caused by momentary external noise.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a plurality of memories is provided to correspond to each data stream of an incoming digital TV signal in one to one fashion, each of which memories has an identical initial value of zero or close to zero stored therein in advance. In the meantime, there is a computing element having a data identical to a synchronizing signal included in the digital TV signal stored therein in advance for comparing and computing each of the received data streams to the already stored synchronizing data in succession. A positive value is provided if identical as a result of the comparison, and a zero or a negative value is provided if not identical. The adder updates values stored in respective memories by adding the positive values or the zeros(or the negative values) from the computing element as a result of the comparison-computation to the values in the corresponding memories. There is a synchronization detector for comparing the updated stored values to a preset synchronizing reference value, to forward the stored values equal to or greater than the synchronizing reference value as a position signals of the synchronizing signals. Eventually, the initial value which is zero or a positive value close to zero becomes a minimum value during the aforementioned process is conducted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 4b explains the operation of the pattern matching unit in FIG. 4a;

FIG. 4c explains the operation of the adder in FIG. 4a;

FIG. 7b explains the operation of the synchronizing correlator in FIG. 7a;

FIG. 7c explains the operation of the adder in FIG. 7a;

DETAILED DESCRIPTION OF THE PREFERRED EMBODIMENT

Figure 4A:
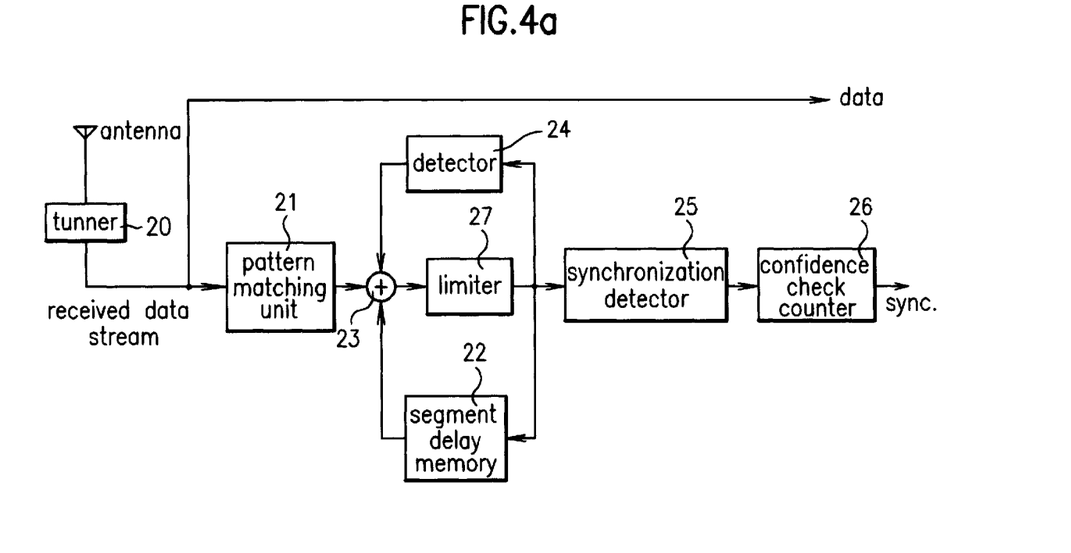
FIG. 4a illustrates a block diagram showing a system of a digital TV receiver in accordance with a first preferred embodiment of the present invention.
Figure 4B:
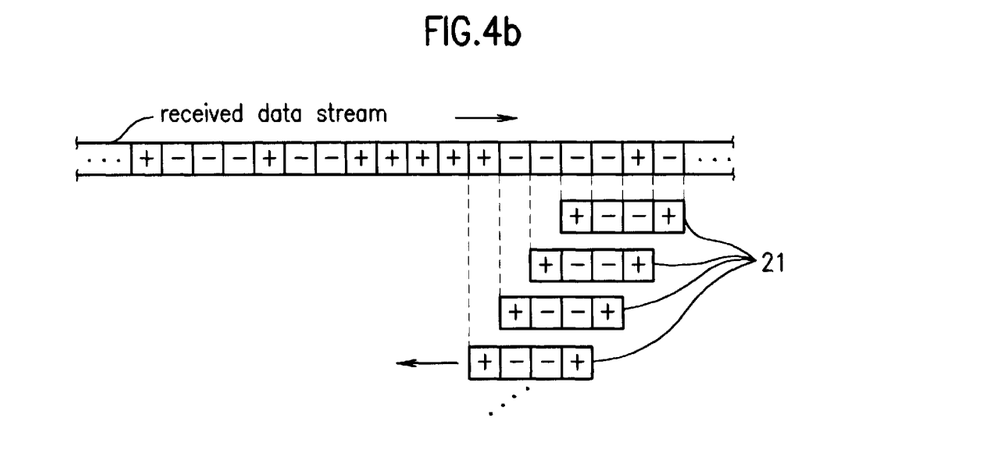
Figure 4C:
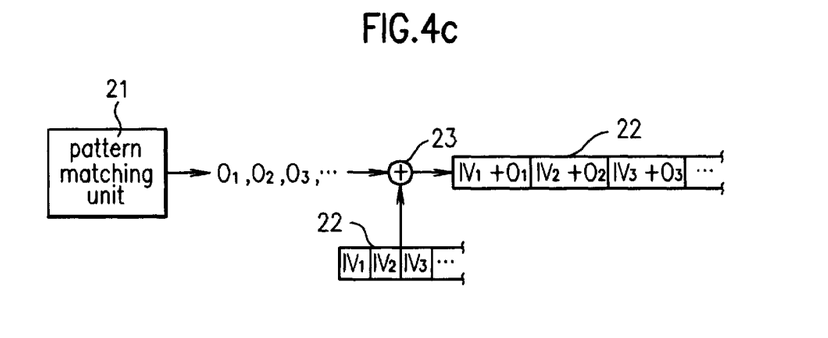
Figure 5:
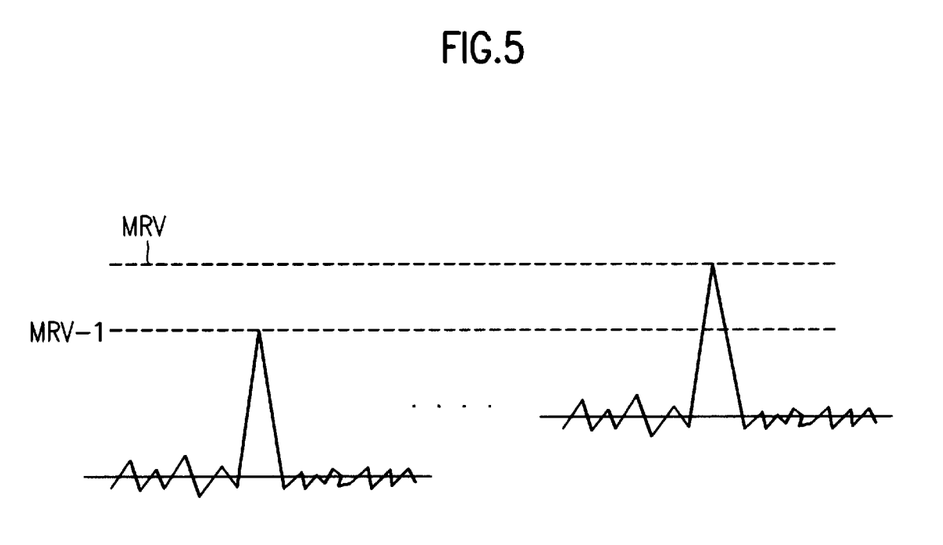
FIG. 5 illustrates waveforms of synchronous reference signals in accordance with a first preferred embodiment of the present invention.
Figure 6:
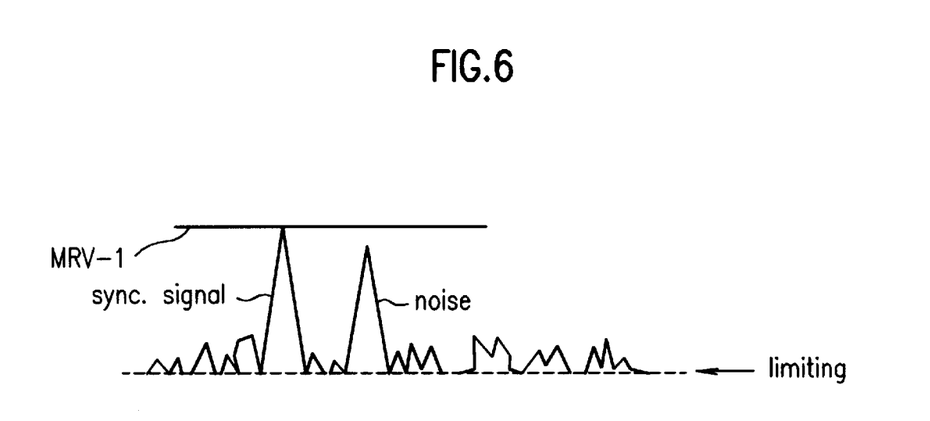
FIG. 6 illustrates a waveform for explaining an example of detecting a synchronizing signal from a digital TV signal including a momentary noise in accordance with a first preferred embodiment of the present invention.

Reference will now be made in detail to the preferred embodiments of the present invention, examples of which are illustrated in the accompanying drawings. FIG. 4a illustrates a block diagram showing a device for detecting a synchronizing signal from a VSB transmission signal, FIG. 4b explains the process of the pattern matching unit 21 in FIG. 4a for comparing symbols of a received data stream to a symbol pattern of the stored synchronizing signal, FIG. 4c is a diagram for explaining a process of updating initial values "IV" in the segment delay memories in FIG. 4a, FIG. 5 illustrates waveforms of synchronizing reference values in the synchronizing detector in accordance with a first preferred embodiment of the present invention, FIG. 6 illustrates a waveform for explaining an example of detecting a synchronizing signal from a digital TV signal including a momentary noise in accordance with a first preferred embodiment of the present invention.

Referring to FIG. 4a, the digital TV receiver includes a pattern matching unit 21, a segment delay memory 22, an adder 23, a detector 24, a synchronization detector 25, a confidence check counter 26, and a limiter 27. As a storage, the segment delay memory 22 includes 832 segment delays each having an identical initial value "IV" stored therein advance, which initial value may be "0" or a positive value close to zero, such as "1". As explained, the segment delay memory 22, as a storage, includes a plurality of segment delays and a window for opening the segment delays one by one. That is, each of the segment delays serves as a memory. Each of the segment delays corresponds to the 832 data in each data stream in a VSB transmission signal. As a comparator, the pattern matching unit 21 is in storage of a symbol pattern identical to a symbol pattern of an actual synchronizing signal included in a digital TV signal in advance, which symbol pattern has "+,−,=,+". Accordingly, the pattern matching unit 21, as a comparator, serves to compare symbols of the 832 data in each received data stream to the already stored symbol pattern of the synchronizing signal in the digital TV signal. In the meantime, each data stream includes 828 data symbols other than the four symbols for the synchronizing signal.

First, the tuner 20 tunes to one signal of digital TV signals received through the antenna. Upon reception of data streams of a tuned VSB transmission signal, as shown in FIG. 4b, the pattern matching unit 21 compares symbols of the received data streams to the symbol pattern "+,−,−,+" of the synchronizing signal in the digital TV signal already stored in itself by a unit of four symbols in succession, to provide "1" if identical, and "0" if not identical. In this instance, the pattern matching unit 21 may provide a positive number other than "1" if identical(for example, "2"), and a positive number close to "0" but other than "0" if not identical(for example, "1"). But the positive number provided when identical should be greater than the positive number provided when not identical. In the meantime, as shown in FIG. 4b, the pattern matching unit 21 compares the symbol pattern of four symbols already stored in itself and symbols of the received data stream by a unit of four symbols while the pattern matching unit 21 shifts the received data stream by one clock, i.e., by one symbol. Then, as shown in FIG. 4c, the adder 23 adds the initial values "IV1,IV2,IV3, . . . "("0" in this embodiment) of the 832 segment delays in the segment delay memory 22 to outputs "01, 02, 03, . . . " from the pattern matching unit 21 respectively, to update the values "IV1, IV2, IV3, . . . " stored in the segment delays to renewed values of "IV1+01, IV2+02, IV3+03, . . . " for the first time. If this operation is repeated, because symbols of the data stream will be continuously identical to the already stored symbol pattern of the synchronizing signal in a synchronizing signal section of the data stream, the storage values in pertinent segment delays will be kept increasing, while the storage values in segment delays in the data section other than the synchronizing signal section hold the initial values "0" as they are or increase slightly because most of the symbols of the data are not identical to the already stored symbol pattern of the synchronizing signal. In the meantime, if at least one of the updated storage values in the 832 segment delays which represent one data stream has a preset maximum value "MRV", the detector 24 provides "−" to the adder 23 during the 832 symbols in the next data stream are received, and, if all of the updated storage values are less than the preset maximum value "MRV", the detector 24 provides "0". In this instance, though the detector 24 provides either "−1" or "0", as explained, a negative number other than "−1" may be used. The negative number other than "−1" used in this instance(for example, −2) has an absolute value the same with the positive number provided from the pattern matching unit 21.

In the meantime, as explained, in the related art, because each symbol pattern is identical to the already stored symbol pattern of the synchronizing signal in the synchronizing signal section in each data stream, values stored in pertinent positions in the segment delay memory 22 will keep increasing. However, in the present invention, if at least one of the values stored in the segment delay memory 22 reaches to "MRV", i.e., if the detector 23 detects the "MRV", the detector 23 provides "−1". Consequently, even if the pattern matching unit 21 provides "+1" following the match of the already stored symbol pattern of the synchronizing signal and the symbols of the received data stream, the "+1" is offset by the "−1" from the detector 24. At the end, the segment delay memory 22 which stores a signal from the adder 23 will not store a value greater than the preset maximum reference value "MRV". Eventually, as shown in FIG. 5, the maximum values accumulated in the segment delay memory 22 are always kept to be "MRV" or "MRV-1", and the values stored in the segment delay memory 22 are always smaller than "MRV" or "MRV-1". Because, as explained, it is highly probable that the cases when the already stored symbol pattern of the synchronizing signal and the received symbol patterns of each of the data streams are not matched in section other than each synchronizing signal section of each data stream. Therefore, the pattern matching unit 21 is made to provide "0" continuously in most of the cases, and, moreover, the values in the segment delay memory 22 stored in sections other than the synchronizing signal section in each data stream are slightly or a little greater than the initial value "0". That is, the segment delays in the synchronizing signal section in each data stream keeps "MRV" or "MRV-1" continuously, and the segment delays in the data section other than the synchronizing signal section in each data stream keeps "0" or a positive value close to "0" continuously, because cases when the symbols are identical are very rare.

In the meantime, if a momentary noise is received during reception of each data stream, there can be a case when any one of the segment delays in the segment delay memory 22 has the maximum value "MRV". That is, though there is the synchronizing signal section existing in each data stream actually, a case when any one of the symbols in the synchronizing signal section is changed momentarily due to an external noise, causing the symbols in the synchronizing signal section not to be matched with the already stored symbol pattern of the synchronizing signal. In this instance, the segment delays falling on positions of the synchronizing signal among the segment delays in the segment delay memory 22 may have reduced values "MRV-1" due to the momentary external noise while the segment delays keep the maximum reference values "MRV" until the momentary external noise, such as ghost, is occurred. Accordingly, as shown in FIGS. 5 and 6, the synchronization detector 25 may have a reference value of the "MRV-1" for detecting the synchronizing signal section in each data stream. Of course, the synchronization detector 25 may have a reference value of, not "MRV-1", but "MRV-positive number". In this instance, the positive number may be a positive number significantly greater than "1" if a correlator is employed instead of the pattern matching unit 21 as a comparator. This case will be explained in detail in explanation on a second embodiment of the present invention. However, as such momentary noise ceases to exist soon, the pattern matching unit 21 provides "1" in the synchronizing signal section in match to the already stored symbol pattern of the synchronizing signal upon reception of the next data stream, and the segment delays falling on the synchronizing signal section keep to have the maximum reference values of "MRV", again. In the meantime, the signals provided from the adder 23 for storing in the segment delay memory 22 may overflow in a negative direction due to an external influence. The storage values overflowed in the negative direction may affect detection of the synchronizing signal from the storage values. Therefore, the limiter 25 limits the signal from the adder 23 underflowing in the negative direction.

In the meantime, the synchronization detector 25 detects values greater than the reference value "MRV-1" among outputs from the adder 23 each of which is a sum of the value stored in the segment delay memory 22, an output from the pattern matching unit 21 and a signal from the detector 24, and a detected position of this instance is provided as a position of the synchronizing signal of an HDTV signal. That is, a position of the segment delay in the segment delay memory 22 is detected as a position of the synchronizing signal. In other word, taking the reference value "MRV-1" detected by the synchronization detector 25 as a synchronizing signal which could not maintain the maximum reference value "MRV" due to the momentary external noise, positions of the segment delays having values equal to or greater than the reference value "MRV-1", i.e., values of "MRV-1" and "MRV" are taken as positions of the synchronizing signals.

In the meantime, the confidence check counter 26 checks regular periods of the signals from the synchronization detector 25 and determines momentary signals deviated from the regular periods as errors, to discard the signals, for forwarding rest of the signals having the regular periods as the position signals of the synchronizing signals, finally.

As explained, in the first embodiment, while the initial values of the segment delay memory 22 are "0" which are the smallest of the values stored in the segment delay memory 22, the "MRV" is the greatest of the values which can be stored in the segment delay memory 22. And by detecting "MRV-1", a position of a synchronizing signal is detected. Accordingly, as shown in FIG. 6, even if an external noise, such as a ghost, is received, because the noise is always made to be smaller than the synchronizing signal, distinguished from a ghost, a position of the synchronizing signal of an exact size can be detected regardless of presence of any size of ghost.

SECOND EMBODIMENT

The second embodiment is different from the first embodiment in that the second embodiment employs a synchronization correlator instead of the pattern matching unit 21 in FIG. 4a.

Figure 7A:
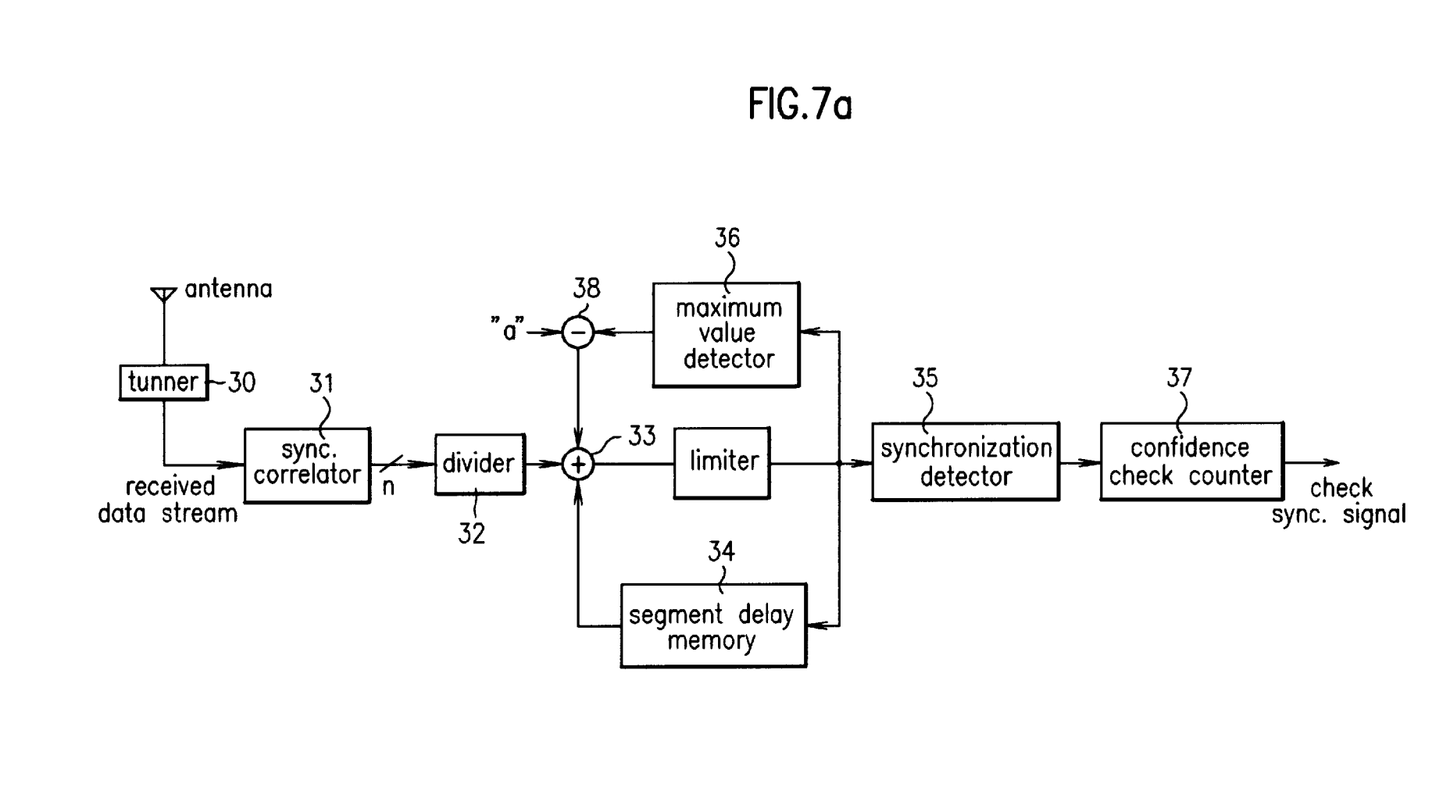
FIG. 7a illustrates a block diagram showing a system of a digital TV receiver in accordance with a second preferred embodiment of the present invention.
Figure 7B:
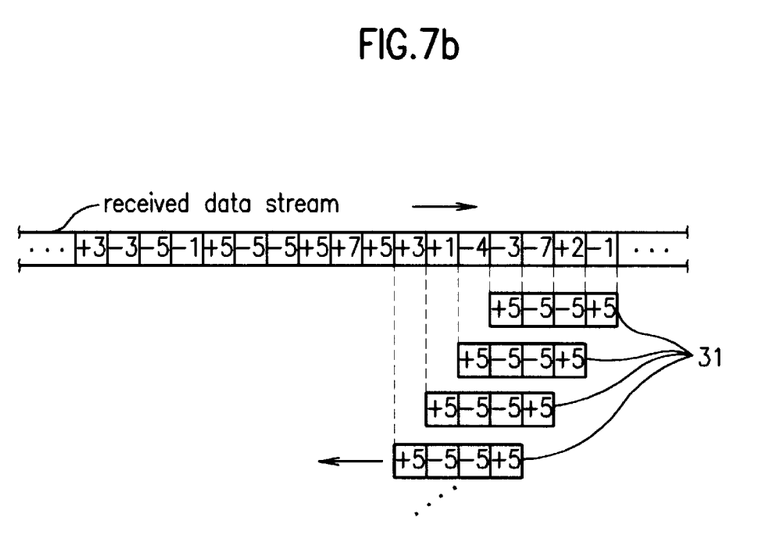
Figure 7C:
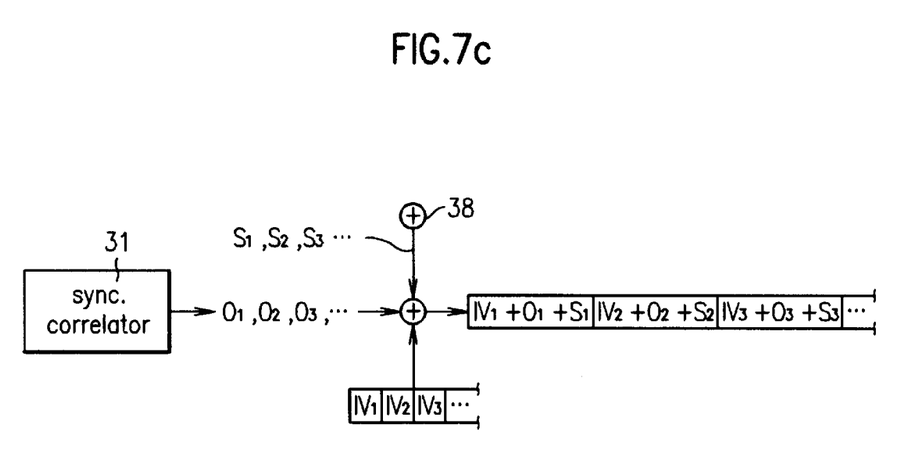
Figure 8:
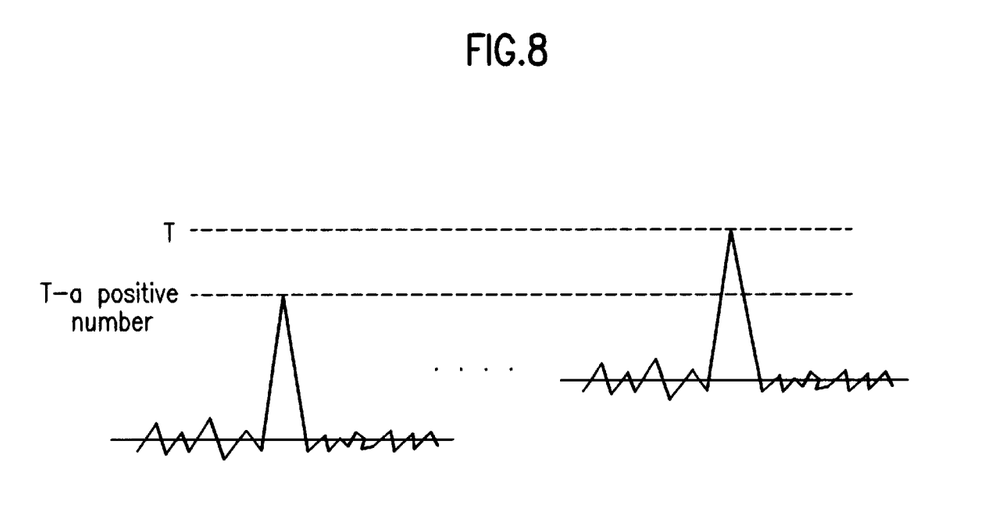
FIG. 8 illustrates waveforms showing synchronous reference values for the synchronizing detector in FIG. 7a; and, FIG. 9 illustrates a waveform for explaining an example of detecting a synchronizing signal from a digital TV signal including a noise in accordance with a second preferred embodiment of the present invention.
Figure 9:
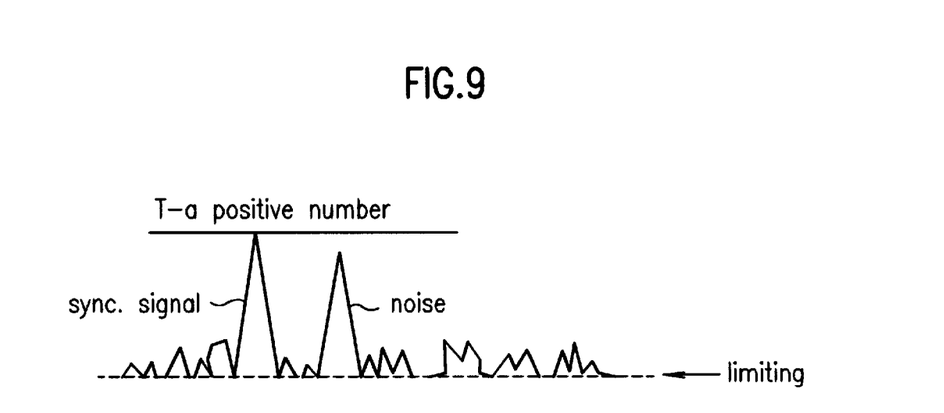

Referring to FIG. 7, when one of digital TV signals received through the antenna is tuned by the tuner 30, the synchronization correlator 31 subjects each of the data streams in the tuned digital TV signal to correlation operation with the already stored synchronizing pattern "+5,–5,–5,+5" of the digital TV signal. A resultant of the correlation will be at a maximum when the received data stream is identical to the synchronizing pattern "+5,–5,–5,+5". Here, the symbol pattern "+5,–5,–5,+5" of the synchronizing signal is one of examples, and other symbol patterns may also be used. Therefore, the maximum value can be obtained by calculation in advance. In the meantime, as shown in FIG. 7b, the synchronization correlator 31, as a comparator-calculator, subjects 832 data in each of the received data streams to correlation operation with the synchronizing pattern "+5,–5,–5,+5" in succession and obtains each correlation resultant in succession. As shown in FIG. 7c, the identical initial values "0" already stored in the segment delays in the segment delay memory 34 are added to the correlation resultants received in succession and stored in each pertinent segment delay in succession. Here, if the received data stream is identical to the synchronizing pattern "+5,–5,–5,+5", the maximum value is provided, and if not, "0"(a value close to "0" may be used instead of "0") is provided. A positive value close to "0" may be used instead of the initial value "0". Different from the pattern matching unit 21 in the first embodiment, the synchronization correlator 31 provides, not one bit, but 'n' bits of positive value(n is a positive integer). As shown in FIG. 7c, outputs from the synchronization correlator 31 are added to respective initial values "0" in corresponding segment delays in the segment delay memory 34 at the adder 33 and stored respective segment delays in the segment delay memory 34. The divider 32 is used for dividing each of the outputs from the synchronization correlator 34 in a preset ratio. The divider 32 is used for reducing a size of the segment delay memory 34. That is, different from the pattern matching unit 21 in the first embodiment, because each of the outputs from the synchronization correlator 31 may be, not "1", but great positive values, a size, i.e., a capacity of the segment daily memory 34 should be of course large, correspondingly. The use of the divider 32 can reduce the size of the segment delay memory 34. The segment delay memory 34 has 832 segment delays, as explained, each with an initial value "0" stored therein. Therefore, everytime each of the data streams is received, signals from the adder 33 are updated, and stored to respective segment delays in sequence. Thus, if the accumulation process is repeated continuously after the correlation operation, 'n' bit values will be provided from the synchronization correlator 31 to the adder 33 in a synchronizing signal section of each data stream, increasing the values stored in the segment delays in the segment delay memory 34 falling on the synchronizing signal section rapidly as before. This is because, when the already stored symbol pattern "+5,–5,–5,+5" of the synchronizing signal and the received data stream are identical, a correlation resultant of them will be very large. However, since it is highly probable that the already stored symbol pattern of the synchronizing signal and the received data stream are not identical in the data section in each data stream, "0" are mostly provided from the synchronization correlator 31. The corresponding segment delays in the segment delay memory 34 will store values close to the initial value "0" even if the accumulation proceeds. In the meantime, the maximum value detector 36 checks outputs from the adder 33 for 832 clocks corresponding to one data stream every time each data stream is received, to provide the maximum value "MV". That is, the maximum value "MV" is detected from values stored in the segment delay memory 34 in a data stream unit. As shown in FIG. 7c, the subtracter 38 subtracts the maximum value "MV" detected by the maximum value detector 36 from an already stored threshold value "T" and provides to the adder 33 for the 832 clocks of the data stream received in succession. If a resultant of the subtraction is a positive value, i.e., if the detected maximum value "MV" is smaller than the threshold value "T", "0" is provided to the adder 33. A positive value close to "0" may be used instead of the "0". Opposite to this, if the maximum value detector 36 checks outputs from the adder 33 for 832 clocks corresponding to one data stream, to obtain the maximum value "MV", and, if the maximum value "MV" is greater than the threshold value "T", a difference of the two values will be provided as a negative value by the subtracter 38. In this instance, since the negative value corresponding to a value as much as the detected maximum value "MV" is greater than the threshold value "T" is provided by the adder 33 for 832 clocks of the next data stream, to deduct by the much the maximum value is greater than the threshold value "T" from the maximum value, no value greater than the threshold value "T" is stored in the segment delay memory 34. Accordingly, the adder 33 provides IV1+01+S1, IV2+02+S2, IV3+03+S3, . . . in a sequence, which are stored in corresponding segment delays, respectively. Since this process is repeated in data stream units, the values stored in the segment delays are updated in data stream units. The threshold value "T" is preset through numerous experiments, and should be greater than any size of ghosts which can be produced. By the way, if there is a noise in channel, cases happen when a wrong synchronizing pattern is received occasionally due to the noise even in the synchronizing signal section of the data stream. However, the same loop is conducted even in these cases because the maximum value detector 36 and the subtracter 38 calculate respective outputs in data stream units, i.e., 832 clock units, newly. That is, as explained, after outputs from the adder 33 are checked for 832 clocks of one data stream to detect a maximum value from values stored in the segment delay memory 34, "0" or a negative number is provided from the subtracter 38 to the adder 33 for 832 clocks of the next data stream depending on a symbol of a number obtained by subtracting the maximum value "MV" momentarily reduced due to the noise from the preset threshold value "a". Since such a ghost noise is temporarily occurred and ceases to exist, variations of the maximum value caused by the ghost are removed naturally if the accumulation loop is repeated for many times. At the end, the segment delay memory 34 always stores a maximum value "MV" of a size smaller than the threshold value "T" in the synchronizing signal section. As shown in FIG. 8, the maximum value "MV" among the values accumulated by loop is always maintained to be the threshold value "T" or a "T-N"(N is a positive number) slightly smaller than the threshold value "T", and, as shown in FIG. 9, a value from an influence of the ghost is always smaller than the maximum value "MV". Meanwhile, the synchronization detector 35 detects a value greater than "T-N" slightly smaller than the threshold value among the values stored in the segment delay memory 34 as a position signal of the synchronizing signal every time each data stream is received. Therefore, the synchronization detector 35 can always detects a position of the synchronizing signal accurately regardless of the noise, such as a ghost. As has been already explained in the first embodiment, the confidence check counter 37 keeps checking the synchronizing signal section of every data stream, to forward only signals with regular periods as synchronizing position signals. In the meantime, signals from the adder 33 for storage in the segment delay memory 34 can be overflowed in a negative direction due to an external influence or the like. Such signals overflowed in the negative direction may affect the synchronization detector 35 in detection of the positions of the synchronizing signals. Therefore, in order to remove such an influence, the limiter 39 removes components overflowed in the negative direction from signals provided from the adder 33.

As explained, the device and method for detecting a synchronizing signal from a digital TV signal in accordance with a second preferred embodiment of the present invention has the following advantages.

First, because a position of a synchronizing signal is detected by a method in which a maximum value is detected from values updated and stored in the segment delay memory instead of a method in which plus levels higher than a given level is limited for preventing divergence of a detected synchronizing signal, the position of the synchronizing signal can be detected regardless of ghost noises. And, a wrong detection of the synchronizing signal that may be caused by limiting the plus side signal is prevented fundamentally.

Second, divergence of the values stored in the segment delay memory over a given level can be prevented by presetting the threshold value, subtracting a maximum value in the segment delay memory from the threshold value, and updating the values stored in the segment delay memory according to a value being subtracted.

Third, the use of the divider can reduce a memory size compared to the related art device which uses the correlator.

It will be apparent to those skilled in the art that various modifications and variations can be made in the device for detecting a synchronizing signal from a digital TV signal of the present invention without departing from the spirit or scope of the invention. Thus, it is intended that the present invention cover the modifications and variations of this invention provided they come within the scope of the appended claims and their equivalents.

What is claimed is:

1. A digital TV receiver comprising:
    a synchronization correlator for subjecting an already stored symbol pattern of a synchronizing signal and symbols of a digital TV signal received in fixed data stream units to correlation operation in succession to provide a positive value if found identical as a result of the correlation operation or either one of a zero and a negative value if found not identical as the result of the correlation operation, each of the data streams having a plurality of symbols;
    memories each in storage of an identical initial value, the memories corresponding to the plurality of symbols in each of the data streams in one to one fashion;
    an adder for adding signals provided as many as a number of symbols in the data stream from the synchronization correlator in succession to values stored in the corresponding memories in succession when each of the data streams is received and keeping updating the values stored in the memories in succession by storing the added signals to the corresponding memories;
    a maximum value detector for detecting a maximum value from the values stored in the memories for every data stream;
    a subtracter for subtracting the maximum value from a preset threshold value every time each of the data streams is received, to provide the same negative value as obtained in the subtraction when a resultant of the subtraction is a negative value or a zero when the resultant of the subtraction is zero or a positive value to the adder during the next data stream is received; and,
    a synchronization detector for checking the values stored in the memories for every data stream to detect values equal to or greater than the threshold value—the first positive number as position signals of the synchronizing signals.

2. A digital TV receiver as claimed in claim 1, wherein the symbol pattern of the synchronizing signal is identical to an actual symbol pattern of the synchronizing signal included in the digital TV signal.

3. A digital TV receiver as claimed in claim 1, further comprising a confidence check counter for checking periods of signals from the synchronization detector, to provide only signals of regular periods as position signals of the synchronizing signals.

4. A digital TV receiver as claimed in claim 1, wherein each of the data streams includes four symbols corresponding to the symbol pattern of the synchronizing signal and 828 data symbols.

5. A digital TV receiver as claimed in claim 4, wherein the four symbols corresponding to the symbol pattern of the synchronizing signal are "+5,−5,−5,+5".

6. A digital TV receiver as claimed in claim 4, wherein the digital TV signal is a VSB signal.

7. A digital TV receiver as claimed in claim 1, wherein a plurality of the memories form one segment delay memory having a plurality of segment delays.

8. A digital TV receiver as claimed in claim 1, further comprising a limiter for limiting components of the signals from the adder overflowing in a negative direction.

9. A method for detecting a synchronizing signal in a digital TV receiver having a plurality of memories, comprising the steps of:
    (1) storing an identical initial value in each of the plurality of memories;

(2) receiving digital TV signals at the digital TV receiver in data stream units each having symbols corresponding to the memories in one to one fashion;

(3) comparing the symbols in each data stream to a preset symbol pattern of the synchronizing signal in succession and updating values stored in the memories for the first time by repeating a process in data stream units in succession, in which either zeros or first negative numbers are added to the values stored in corresponding memories if found not identical as a result of the comparison or first positive numbers are added to the values stored in the corresponding memories if found identical as the result of the comparison; and, (4) updating the first updated stored values for the second time after the step (3) for each data stream, by deducting by the first positive number from each of the first updated stored values representing the next data stream when at least one of the first updated stored values reaches to a maximum reference value and maintaining the first updated stored values when all of the first updated stored values are smaller than the maximum reference value; and, (5) comparing the second updated stored values to a preset synchronizing reference value for every data stream, to detect the second updated stored values as position signals of the synchronizing signals when the second updated stored values are equal to or greater than the synchronizing reference value.

10. A method as claimed in claim 9, further comprising the step of removing components of the second updated stored values overflowing in a negative direction before the comparison of the second updated stored values to the preset synchronizing reference value.

11. A method as claimed in claim 9, further comprising the steps of checking the detected position signals of the synchronizing signals of being signals of regular periods, and forwarding the detected position signals finally only when the position signals have regular periods.

12. A method as claimed in claim 9, wherein the symbol pattern of the synchronizing signal is preset to be identical to an actual symbol pattern of the synchronizing signal included in the digital TV signal.

13. A method as claimed in claim 9, wherein the symbol pattern of the synchronizing signal includes one or more than one symbols.

14. A method as claimed in claim 13, wherein the symbol pattern of the synchronizing signal includes four symbols of "+,−,−,+".

15. A method as claimed in claim 9, wherein the digital TV signal is a VSB transmission signal.

16. A method as claimed in claim 9, wherein the plurality of the memories form one segment delay memory having a plurality of segment delays.

17. A method as claimed in claim 9, wherein the first positive number and the first negative number are "+1" and "−1", respectively.

18. A method as claimed in claim 9, wherein the synchronizing reference value is "the maximum reference value −1".

19. A method as claimed in claim 9, wherein the initial value is either zero or a positive number close to "0".

20. A method for detecting a synchronizing signal in a digital TV receiver having a plurality of memories, comprising the steps of:

(1) storing an identical initial value in each of the plurality of memories;

(2) receiving digital TV signals at the digital TV receiver in data stream units each having symbols corresponding to the memories in one to one fashion;

(3) correlating the symbols in each data stream to a preset symbol pattern of the synchronizing signal in symbol units in succession and updating values stored in the memories for the first time by repeating a process in data stream units, in which first positive numbers are added to the values stored in the corresponding memories if found identical as a result of the correlation or either zeros or first negative numbers are added to the values stored in the corresponding memories if found not identical as the result of the correlation; and, (4) detecting a maximum value from the stored first updated values after the step (3) for the data stream;

(5) updating the first updated stored values in the memories for the second time, by subtracting the detected maximum value from a preset threshold value, to add a second negative value to each of the first updated stored values representing the next data stream if each subtraction resultant is a second negative number or to add a zero to each of the first updated stored values representing the next data stream if each subtraction resultant is either a zero or a second positive number; and, (6) comparing the second updated stored values to a preset synchronizing reference value for each data stream, to detect the second updated stored values as position signals of the synchronizing signals when the second updated stored values are equal to or greater than the synchronizing reference value.

21. A method as claimed in claim 20, wherein the initial value is either zero or a positive number close to "0".

22. A method as claimed in claim 20, wherein the step (3) further includes the steps of;

dividing the first positive number by a first positive integer 'k', and adding the divided value to the values stored in the memories, for reducing a size of the memories.

23. A method as claimed in claim 20, further comprising the steps of checking the detected position signals of the synchronizing signals of being signals of regular periods, and forwarding only position signals that have regular periods.

24. A method as claimed in claim 20, wherein the symbol pattern of the synchronizing signal is preset to be identical to an actual symbol pattern of the synchronizing signal included in the digital TV signal.

25. A method as claimed in claim 20, wherein the symbol pattern of the synchronizing signal includes one or more than one symbols.

26. A method as claimed in claim 25, wherein the symbol pattern of the synchronizing signal includes four symbols of "+5,−5,−5,+5".

27. A method as claimed in claim 20, wherein the digital TV signal is a VSB signal.

28. A method as claimed in claim 20, wherein the plurality of the memories form one segment delay memory having a plurality of segment delays.

29. A method as claimed in claim 20, wherein the synchronizing reference value is the threshold value—a third positive number.

30. A method as claimed in claim 29, wherein the third positive number is a positive integer equal to or greater than "1".

31. A method as claimed in claim 20, wherein the first positive number and the second positive number are positive integers equal to or greater than "1", respectively.

32. A method as claimed in claim 20, wherein the first negative number and the second negative number are negative integers smaller than "−1", respectively.

* * * * *